INVENTOR.
WILLIAM C. HAMPTON
BY Herman L. Gordon
ATTORNEY

United States Patent Office 2,932,784
Patented Apr. 12, 1960

2,932,784

TEMPERATURE-RESPONSIVE BRIDGE CIRCUIT

William C. Hampton, Takoma Park, Md., assignor to American Instrument Company, Inc., Silver Spring, Md.

Application July 12, 1955, Serial No. 521,484

3 Claims. (Cl. 323—69)

This invention relates to temperature-responsive bridge circuits, and more particularly to a temperature-controlled circuit of the manually settable type.

A main object of the invention is to provide a novel and improved temperature-controlled circuit of the type employing a thermistor, or similar temperature sensing element, said circuit being simple in construction, being easy to set for operation at a desired temperature, and being arranged to prevent overheating of the temperature-sensing element.

A further object of the invention is to provide an improved temperature-responsive bridge circuit of the manually-settable type, said circuit being arranged to automatically vary the supply voltage thereto in accordance with the various range settings of the bridge circuit, the variation of supply voltage being such that excessive current cannot pass through the temperature-sensitive element of the circuit, and therefore said temperature-sensitive element will not be called upon to carry an excessively high current therethrough.

A still further object of the invention is to provide an improved temperature-responsive apparatus having high sensitivity throughout a wide temperature range, having means to protect its temperature-sensing element against current overloads, whereby said sensing element is stable in performance, and being especially suitable for use with a recorder, the apparatus being provided with means for increasing the recorder chart span width per degree of temperature when used with a recorder having a null point with a very low millivolt span, or when used with a corresponding direct current balancing amplifier or indicator.

Further objects and advantages of the invention will become apparent from the following description and claims, and from the accompanying drawings, wherein:

Figure 1:
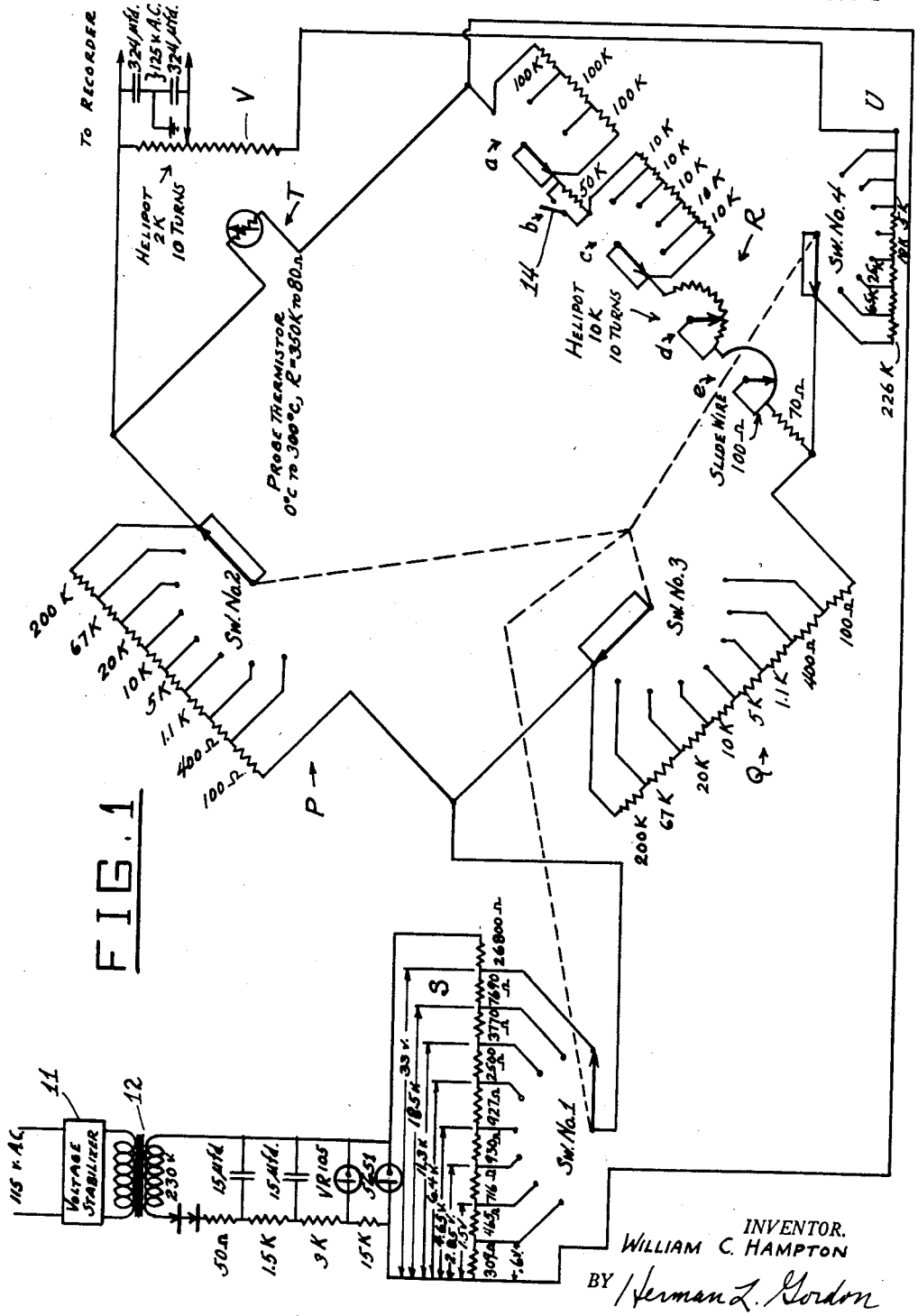
Figure 1 is a schematic wiring diagram of an improved temperature-responsive bridge circuit constructed in accordance with the present invention.

The apparatus of the present invention utilizes means to avoid temperature rise of the control element, for example, a thermistor, said means acting to positively prevent excessive current from flowing through the control element, means for maintaining high sensitivity throughout a wide temperature range, and means for increasing chart span width per degree of temperature when used with a recorder having a null point with a very low millivolt span, or with some other suitable D.C. balancing amplifier or indicator.

By ganging together range-changing switches of the bridge circuit and a supply voltage-adjusting switch, the supply voltage to the bridge is varied according to the changes made in the ratio arms of the bridge and the output potentiometer section thereof. A variable resistor of the "Helipot" type in the output circuit portion of the bridge provides adjustment of the chart span per degree temperature, whereby small changes in temperature can be readily recorded without loss of sensitivity.

The power supply to the thermistor bridge circuit is so arranged as to produce rectified D.C., supplied from a 115 volt A.C. line through a conventional voltage stabilizer unit 11. The A.C. source of supply, passing through the voltage stabilizer unit, feeds a two-winding transformer 12, to give 230 volts A.C. on the secondary side thereof. The supply from the secondary winding is rectified and filtered, after which regulation is controlled by the aid of two different types of voltage regulator tubes. A tapped potentiometer is loaded across a tube of the 5651 type, and for practical purposes can be considered a constant load S shown in Figure 1. Switch No. 1 is so designed as to change voltage taps from 0.6 volt, 1.5 volts, 2.85 volts, 4.65 volts, 6.4 volts, 11.3 volts, 18.5 volts, and 33 volts.

The change in voltage is so arranged that with an increase in the resistance arms P and Q of the bridge circuit and in the output potentiometer load V and U, the voltage supply to the bridge circuit will also be increased.

The ratio arms P and Q of the bridge circuit are carefully matched to be of equal resistance, no matter to what positions switches No. 2 and No. 3 may be adjusted.

Arm T of the bridge circuit forms the unknown resistance of the circuit and is connected to a thermistor thermometer, used as a sensing element.

The measuring arm of the bridge circuit, marked R, is made adjustable in resistance value by five sets of adjustments marked a, b, c, d, and e, as follows:

(a) is a coarse adjustment in steps of 100,000 ohms, up to 300,000 ohms.

(b) is part of the medium adjustment and consists of a 50,000 ohm resistor, which can be loaded into arm R, or taken out by short-circuiting with a push pull switch 14.

(c) consists of the other portion of the medium adjustment in steps of 10,000 ohms to a total of 50,000 ohms.

(d) is a 10-turn "Helipot," having a resistance value of 10,000 ohms.

(e) is a slide wire adjustment, having a resistance value of 100 ohms.

Settings d and e are each fitted with a vernier dial to enable various adjustments to be easily computed from dial readings to actual resistance values totalled in the bridge arm R.

Included in the bridge arm R is a fixed resistor of 70 ohms to avoid a complete short circuit of the arm R at the lowest voltage setting of 0.6 volt.

The output circuit of the bridge device consists of a variable tap potentiometer V and switch No. 4, controlling a resistor circuit U. Both circuits V and U are connected in series and loaded across the output of the bridge circuit.

Circuit V consists of a 10-turn "Helipot" having a maximum resistance of 2,000 ohms. The movable contact of the "Helipot" and the output end of the bridge circuit connected to the "Helipot" V are available for connection to any recording device which will respond to temperature changes made to the resistance-temperature characteristics of the thermistor thermometer loaded in the bridge circuit arm T. Examples of such devices are a balancing amplifier, an electronic indicator, and similar recording appliances.

By changing the movable arm of the "Helipot" V the pick-off voltage can be manually increased or decreased, as found necessary, when adjusting the input to the controlling device connected to the bridge circuit device.

To avoid any A.C. interference from entering a D.C. balancing amplifier in the output from the thermistor bridge circuit, two 324 mfd. condensers are connected in series across the output from the "Helipot" V, the center point of which is brought to ground potential.

The resistors forming the bridge circuit and the resistors loaded across the regulating power supply can be temperature-controlled by a constant temperature control device, not shown. This is only necessary if the humidity is to be maintained at low relative humidity.

Figure 2:
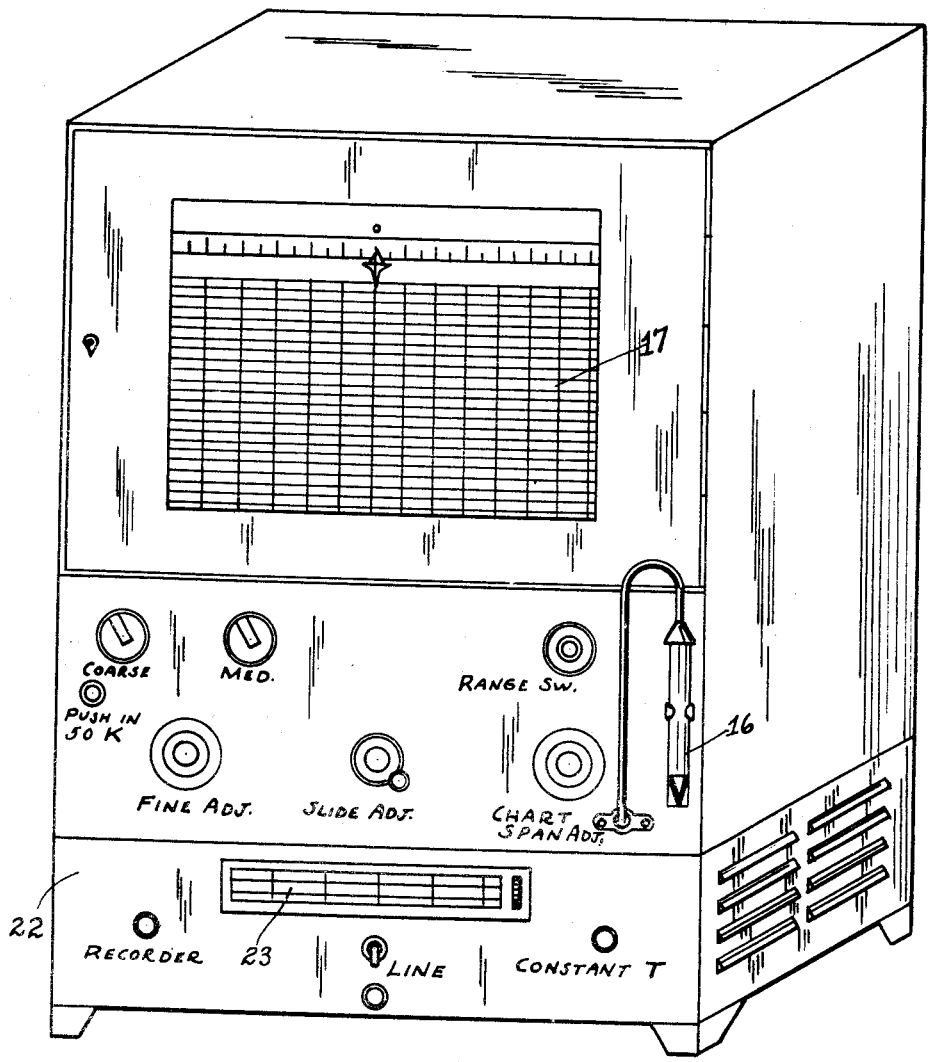
Figure 2 is a perspective view of a temperature recorder and controller employing the bridge circuit of Figure 1.

Figure 2 shows the panel layout of the thermistor bridge circuit and a typical application of the circuit when used to record temperature changes, or adapted to control some typical heating device.

The panel control marked "Range Switch" enables the change required to be made to voltage taps from circuit S when changes are made to the bridge circuit device of arms P and Q, and to the output circuit U, V of the bridge.

For a probe thermistor having an operating range from 0° to 300° C., the "Range Switch" may be marked in suitable steps, such as 15°, 25°, 50°, 75°, 100°, 200° and 300° C. When operating within the temperature range of 0° to 300° C., the "Range Switch" should be set to the temperature setting nearest the desired point of operation, or to the range setting shown on the thermistor calibration chart.

A unique feature of the probe thermistor is its small mass, the effect of which is to minimize self-heating due to current flow. Since such heating effects are even further reduced in thermistors of larger mass, this circuit design is ideally suited to the thermistor type of sensing element. The range settings can be marked to suit any desired temperature range for the thermistor used as a sensing element, and only requires the substitution of another plate with suitable graduations in degrees centigrade, to be fixed on the panel front at the "Range Switch." The dial marked "Chart Span Adj." on the panel located directly underneath the "Range Switch" operates the "Helipot" shown as V in Figure 1. The adjustment is made by a vernier dial marked in suitable divisions, such as 0 to 1,000. By knowing the dial setting, the exact resistance between the movable and fixed arm of the potentiometer can be computed.

The thermistor is housed in a protective tube 16 when it is in its stowed position shown in Figure 2.

A change in resistance per degree change in temperature for any temperature within the range of the thermistor can be evaluated by referring to the calibration data (resistance-temperature characteristic) of the thermistor thermometer connected to arm T of the bridge circuit device shown in Figure 1.

With this information available, the dial of the "Chart Span Adj." can be set to a position which will have some known value in subsequent temperature changes.

For example, let us suppose a recorder 17 is available which has a chart span equal to plus 1 millivolt to minus 1 millivolt. The bridge circuit device can be connected to the recorder and the recorder pen will register changes in temperature in terms of millivolts. By changing the "Chart Span Adj." on the panel front, changes in temperature can be expanded or reduced in chart width per degree temperature, according to the maximum change expected. With a thermistor thermometer in the bridge device having a range from 0° to 300° C., as high as 300° C., and as low as ½° C., per millivolt change can be recorded. Thus, in addition to recording variation of temperature, temperature rise and fall time can also be recorded.

The remaining adjustments on the panel are those which measure the unknown resistance of the thermistor in the bridge circuit device, and are part of the arm R shown in Figure 1. When the dial settings are noted, the actual resistance of the unknown resistance can be computed. This resistance is checked in turn against the calibration data of the thermistor, and the exact temperature is then found.

Among the useful characteristics of the thermistor bridge circuit device of the present invention are the following:

(1) It is suitable for general application as a temperature-sensitive control device.

(2) Any type of thermistor may be employed as the temperature-sensing element.

(3) Due to the small size, simplicity and ruggedness of thermistors, the sensing element of the bridge circuit device can be placed exactly where the temperature needs to be measured or controlled.

(4) The circuit is easily adapted for any specific type of temperature measurement.

(5) The circuit is easily adapted to control temperature in hazardous locations.

(6) The circuit is arranged to maintain high sensitivity over a wide range of temperature.

(7) The temperature can be adjusted by dial settings, once calibration data over the entire range of one or more thermistors has been obtained.

(8) The device can be employed as a recording resistance thermometer when connected to a suitable recorder.

(9) The device can be used to record small or large variations of temperature, depending on the setting made with the chart span adjusting dial when connected to a null point recorder. Temperature changes as small as those detected by other conventional bridge circuits can be indicated or recorded.

(10) Using the device in conjunction with a suitable recorder to function as a resistance bulb recording thermometer, high sensitivity with a low thermal time constant can be obtained.

(11) The circuit is designed to prevent power dissipated in the thermistor from causing temperature changes due to current flow in the thermistor unit, thus preventing drift.

(12) The output of the circuit can be coupled to a suitably designed D.C. balance amplifier in order to operate a relay, where "on" and "off" control is required to control a temperature responsive device.

(13) The output of the circuit can be connected to a suitable electronic null point indicator for indicating variations of temperature as low as 0.001° C. or smaller, depending upon the design of the electronic device.

(14) When used with a suitable recorder for recording temperature changes, the temperature of the apparatus in which the temperature is being measured can be automatically controlled to a very close constancy by the addition of a mercury switch coupled to the pen movement of the recorder. By the addition of a mercury switch, heavy loads can be controlled without the use of conventional mechanical relays.

(15) Should the line power fail when using the bridge device as described in (13), the temperature in the controlled apparatus can be made to fall back toward room temperature, but will automatically return to the original controlled temperature when power is restored. This reliability of return cannot be guaranteed by the use of a bimetal regulator.

(16) The power supply input to the bridge circuit device is not only rectified, filtered and regulated, but is also connected to a voltage divider. Hence, capacitance and inductance interference is eliminated and is not a serious problem.

(17) The bridge circuit device can be located at a considerable distance from the location of the sensing element without serious interference due to resistance of the lead wires.

(18) Any number of sensing elements can be used to record temperatures within a chamber or room. This can be achieved by automatic switching of the individual elements in the bridge arm T by means of an automatic timing device operated by power or spring wind. Each element calibration is referred to in analyzing the results. Greater accuracy of multiple temperature measurements in a closed space can be recorded, as compared with resistance thermometer measurements or thermocouple thermometers.

(19) The device may be employed for measuring temperature, as well as controlling, when connected to a suitable recorder. The device will readily indicate when too much cooling is used. Thus, overshooting and undershooting of temperature due to fly wheel effect can be reduced to a minimum.

(20) The device will assure more accurate calibration of thermistors to determine their resistance-temperature characteristics when connected to a suitable recorder controller to control the temperature of a liquid thermostat bath, as compared with known methods, such as a resistance platinum thermometer bridge measurement, or thermocouple measurement.

(21) The bridge circuit device can be used to measure average temperatures in large rooms or compartments by knowing the resistance-temperature characteristics of a number of thermistors located at various positions within the room or chamber, connected in series or parallel in arm T of the bridge circuit.

While a specific embodiment of an improved temperature-controlled circuit device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a temperature-responsive circuit of the character described, a Wheatstone bridge comprising a pair of output terminals, mechanically variable first and second resistance arms connected in series between said output terminals and defining a first input terminal at their junction, a temperature-sensitive resistance and a calibrated mechanically variable resistance connected in series between said output terminals and defining a second input terminal at their junction, a constant voltage source, a voltage dividing resistor connected across said source providing respective constant voltages between spaced points thereon and one terminal thereof in accordance with the amount of resistance included therebetween, a movable contact element engageable with the voltage dividing resistor to select one of said constant voltages, means connecting said contact element in circuit with said input terminals and said one terminal of the voltage dividing resistor, an indicator circuit connected to said first-named output terminals and including a mechanically variable load resistance, and means mechanically coupling said first and second resistance arms, movable contact element and variable load resistance and being formed and arranged to simultaneously adjust the first and second resistance arms, the resistance included between said movable contact element and said one terminal of the voltage dividing resistor, and load resistance in the same sense, whereby the selected input voltage applied to said input terminals varies in accordance with the selected resistance values of the first and second resistance arms and the variable load resistance.

2. In a temperature-responsive circuit of the character described, a Wheatstone bridge comprising a pair of output terminals, mechanically variable, identical first and second resistance arms connected in series between said output terminals and defining a first input terminal at their junction, a thermistor and a calibrated mechanically variable resistance connected in series between said output terminals and defining a second input terminal at their junction, a constant voltage source, a voltage dividing resistance connected across said source providing respective constant voltages between spaced points thereon and one terminal thereof in accordance with the amount of resistance included therebetween, a movable contact element engageable with the voltage dividing resistance to select one of said constant voltages, means connecting said contact element in circuit with said input terminals and said one terminal of the voltage dividing resistance, an indicator circuit connected to said first-named output terminals and including a mechanically variable load resistance, and means mechanically coupling said first and second variable resistance arms, movable contact element and variable load resistance and being formed and arranged to simultaneously adjust the first and second resistance arms, the resistance included between said movable contact element and said one terminal of the voltage dividing resistance, and load resistance in the same sense, whereby the selected input voltage applied to said input terminals varies in accordance with the selected resistance values of the first and second resistance arms and the variable load resistance.

3. In a temperature-responsive circuit of the character described, a Wheatstone bridge comprising a pair of output terminals, mechanically variable first and second resistance arms connected in series between said output terminals and defining a first input terminal at their junction, a temperature-sensitive resistance and a calibrated mechanically variable resistance connected in series between said output terminals and defining a second input terminal at their junction, an indicator circuit connected across said output terminals, said indicator circuit comprising a potentiometer resistance and a mechanically variable load resistance connected in series, a slidable tap engaging said potentiometer resistance, whereby a selected output voltage may be applied to an indicator connected between said slidable tap and one of the end terminals of said potentiometer resistance, means mechanically coupling said first and second resistance arms and said variable load resistance for simultaneous adjustment in the same sense, a constant voltage source, a voltage dividing resistor connected across said source providing respective constant voltages between spaced points thereon and one terminal thereof in accordance with the amount of resistance included therebetween, a movable contact element engageable with the voltage dividing resistor to select one of said constant voltages, means connecting said contact element in circuit with said input terminals and said one terminal of the voltage dividing resistor, and means mechanically coupling said contact element to the first and second resistance arms and the variable load resistance for adjustment of the resistance included between said movable contact element and said one terminal of the voltage dividing resistor in the same sense simultaneously therewith, whereby the selected input voltage applied to said input terminals varies in accordance with the selected resistance values of the first and second resistance arms and the variable load resistance.

References Cited in the file of this patent

UNITED STATES PATENTS

| | | |
|---|---|---|
| 2,389,615 | Eder | Nov. 27, 1945 |
| 2,635,225 | Hadady | Apr. 14, 1953 |
| 2,743,413 | Johnson | Apr. 24, 1956 |
| 2,759,150 | Rosenbaum | Aug. 14, 1956 |